US008166212B2

(12) United States Patent
La et al.

(10) Patent No.: US 8,166,212 B2
(45) Date of Patent: Apr. 24, 2012

(54) PREDICTIVE DMA DATA TRANSFER

(75) Inventors: Louis Ba La, Webster, NY (US); Scott C. Warner, Ontario, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1334 days.

(21) Appl. No.: 11/823,049

(22) Filed: Jun. 26, 2007

(65) Prior Publication Data

US 2009/0002761 A1     Jan. 1, 2009

(51) Int. Cl.
*G06F 13/28*     (2006.01)
(52) U.S. Cl. ......................................................... 710/22
(58) Field of Classification Search ...................... 710/22
See application file for complete search history.

(56) References Cited

U.S. PATENT DOCUMENTS

| | | | |
|---|---|---|---|
| 5,047,955 A | | 9/1991 | Shope et al. |
| 5,490,260 A | * | 2/1996 | Miller et al. ................... 711/100 |
| 5,579,452 A | | 11/1996 | Ambalavanar et al. |
| 5,710,873 A | | 1/1998 | Romano et al. |
| 5,717,842 A | * | 2/1998 | Ambalavanar et al. ...... 358/1.16 |
| 5,970,223 A | | 10/1999 | Debes et al. |
| 6,463,481 B1 | * | 10/2002 | Lupien et al. .................... 710/22 |
| 6,594,698 B1 | * | 7/2003 | Chow et al. .................... 709/226 |
| 7,321,368 B2 | * | 1/2008 | Owen et al. .................... 345/541 |
| 7,716,387 B2 | * | 5/2010 | Minami ........................... 710/20 |
| 7,831,746 B2 | * | 11/2010 | Lindahl et al. ................... 710/22 |
| 7,843,951 B2 | * | 11/2010 | Spencer ......................... 370/412 |
| 2001/0052038 A1 | * | 12/2001 | Fallon et al. .................... 710/68 |
| 2003/0061457 A1 | * | 3/2003 | Geiger et al. ................. 711/165 |
| 2006/0268317 A1 | | 11/2006 | Lofthus et al. |
| 2006/0268318 A1 | | 11/2006 | Lofthus et al. |
| 2007/0002391 A1 | | 1/2007 | Nagarajan et al. |
| 2008/0126612 A1 | * | 5/2008 | Barrow et al. .................. 710/34 |

OTHER PUBLICATIONS

Motorola Semiconductor Technical Data, "Direct Memory Access Controller (DMAC)," at 222.DatasheetCatalog.com, last visited on Mar. 5, 2007.
National Semiconductor Corporation, "NS32203-10 Direct Memory Access Controller," at www.datasheetcatalog.com, 1995.

* cited by examiner

*Primary Examiner* — Chun-Kuan Lee
*Assistant Examiner* — Ronald Modo
(74) *Attorney, Agent, or Firm* — Fay Sharpe LLP

(57) ABSTRACT

A compression and storage device comprises: a compressor configured to compress data; a central processing unit (CPU) configured to control storage of the compressed data and to perform at least one additional task; an electronic memory organized as storage blocks each having a storage block size; a direct memory access (DMA) engine configured to operate autonomously from the CPU to transfer a current transfer block of compressed data into one or more storage blocks of the electronic memory; and a transfer block size estimator configured to select a transfer block size for the current transfer block based on previous DMA transfers of compressed data, the selected transfer block size being generally different from the storage block size.

24 Claims, 3 Drawing Sheets

PREDICTIVE DMA DATA TRANSFER

BACKGROUND

The following relates to the data processing, compression, transfer, and related arts. It finds particular application in the acquisition, compression, and storage of images during printing, facsimile transfer, and related tasks, and is described with particular reference thereto. The following finds more general application in the storage or transfer of compressed data generally, such as for applications including document scanning, electronic database development, synchronization between computers or between a computer and a personal data assistant (PDA), and so forth.

Document scanning is prevalent in office environments, and is used in operations such as photocopying, scan-to-electronic file operations, facsimile transmissions, and so forth. Some office systems are multi-function devices (MFD's) that typically provide at least scanning, facsimile, photocopying, and printing functionality. These devices are typically operatively connected with a digital data network, such as a local area network (LAN) or wireless local area network (WLAN). The MFD receives input from an image input device such as a scanner bed, a multiple-sheet automated scanner (typically utilizing the scanner bed), or so forth. Alternatively, the digital data network may serve as the image input device, as the document to be printed, sent by facsimile, or otherwise published is received from the digital data network in a page description language (PDL) such as portable document format (PDF), PostScript, Scalable Vector Graphics (SVG), or so forth. A given MFD may be compatible with some PDL formats but not other PDL formats.

The received document is converted into a bitmap. A document received at the scanner bed is converted using an optical reader such as a charge-coupled device (CCD) array along with suitable electronics. A document received in PDL format is processed by suitable algorithms such as raster image processing (RIP) to generate bitmapped pages. To save memory, the image is compressed prior to storage, sometimes using dedicated compression electronics such as an application-specific integrated circuit (ASIC). The image is retrieved from memory at a later time, decompressed, optionally further processed, and ultimately output to a suitable output device such as a marking engine, facsimile engine, or so forth.

To facilitate extensive reading and writing of imaging data from and to electronic data storage, it is known to employ a direct memory access (DMA) engine to transfer imaging data to and from electronic memory autonomously with limited involvement of the central processing unit (CPU) of the MFD, printer, photocopier, or other device. In a typical approach, the DMA performs imaging data transfers while the CPU concurrently performs other tasks, such as image manipulation (e.g., resizing, rotation, format conversion, or so forth), control of the CCD acquisition array, control of the marking engine, or so forth. The DMA engine transmits interrupts to the CPU to coordinate operations of the DMA engine and the CPU. Receipt of an interrupt from the DMA engine causes the CPU to temporarily stop its current processing and handle the interrupt request, which may for example involve allocating a new memory block, identifying the new memory block allocation to the DMA engine, and requesting a new DMA transfer operation.

To minimize the interruptions of the CPU, it is known to use DMA chaining (also called "scatter/gather") to transfer images to and from memory. In DMA chaining, the DMA engine performs autonomous transfer of multiple blocks of data without intervention of the CPU. For example, when an image spanning numerous memory blocks is to be read from memory, the image size (and hence the number of memory blocks) is known a priori. Accordingly, the CPU can request a DMA transfer of the entire set of memory blocks, and the DMA engine employs DMA chaining executing on the DMA engine to recall the entire image from memory in a single autonomous operation.

A problem arises, however, in that DMA chaining is difficult to apply to the compression and storage of images in memory. The image compression produces a widely varying and generally unpredictable image size. For example, the size of the compressed image can vary by a factor of ten or more depending upon the uncompressed image size, the compression algorithm used, parameters of the compression algorithm, the nature of the image (e.g., an image with lots of white space tends to compress much more efficiently than an image of higher complexity), the type of image (e.g., color, grayscale, halftone, etc.), and other factors. The compressed image size is not known a priori because it is compressed and stored "on the fly" with earlier-compressed portions of the image being stored while other portions of the image are still being compressed. Accordingly, it is difficult to use DMA chaining to efficiently load the compressed image into memory.

To address this problem, a common approach is to use a transfer block size that is expected to be typical for typical images processed by the MFD. This approach is less than optimal. If the typical transfer block size is substantially larger than the size of a particular image, then the result is inefficient use of memory as the substantially larger typical transfer block size is allocated for the substantially smaller image. Conversely, if the typical block size is substantially smaller than the size of a particular image, then processing is inefficient as numerous DMA transfer operations and correspondingly numerous CPU interrupts are required to transfer the substantially larger image to memory.

BRIEF DESCRIPTION

Devices and methods are claimed. Some illustrative devices and methods are disclosed as non-limiting illustrative examples.

An illustrative image processing device disclosed as an example comprises: a marking engine; an image compressor configured to compress image data; an image decompressor configured to decompress image data previously compressed by the image compressor; an electronic memory organized as storage blocks each having a storage block size; a direct memory access (DMA) engine configured to transfer compressed image data from the image compressor into the electronic memory and to transfer compressed image data from the electronic memory to the image decompressor; a central processing unit (CPU) configured to coordinate operations of at least the marking engine and DMA engine to cause the marking engine to generate markings in accordance with selected image data input to the image compressor; and a transfer block size estimator configured to adjust a transfer block size used in transfer of compressed image data from the image compressor into the electronic memory based on analysis of previous transfers of compressed image data from the image compressor into the electronic memory, the DMA engine being further configured to transfer a unit of compressed image data having the transfer block size from the image compressor into the electronic memory without intervention of the CPU.

An illustrative compression and storage device disclosed as an example comprises: a compressor configured to compress data; a central processing unit (CPU) configured to control storage of the compressed data and to perform at least one additional task; an electronic memory organized as storage blocks each having a storage block size; a direct memory access (DMA) engine configured to operate autonomously from the CPU to transfer a current transfer block of compressed data into one or more storage blocks of the electronic memory; and a transfer block size estimator configured to select a transfer block size for the current transfer block based on previous DMA transfers of compressed data, the selected transfer block size being generally different from the storage block size.

An illustrative image processing device disclosed as an example comprises: a marking engine; an image compressor configured to compress image data; an image decompressor configured to decompress image data previously compressed by the image compressor; an electronic memory; a direct memory access (DMA) engine configured to transfer compressed image data from the image compressor into the electronic memory and to transfer compressed image data from the electronic memory to the image decompressor; a central processing unit (CPU) configured to coordinate operations of at least the marking engine and DMA engine to cause the marking engine to generate markings in accordance with selected image data input to the image compressor; and a transfer block size estimator configured to adjust a transfer block size for autonomous transfer of compressed image data from the image compressor into the electronic memory based on analysis of previous transfers of compressed image data from the image compressor into the electronic memory.

An illustrative compression and storage method disclosed as an example comprises: compressing data; storing compressed data during compression to an electronic memory organized as storage blocks each having a storage block size, the storing being performed by a direct memory access (DMA) engine configured to operate autonomously from a CPU to transfer a current transfer block of compressed data into one or more storage blocks of the electronic memory; and selecting a transfer block size for the current transfer block based on previous DMA transfers of compressed data, the selected transfer block size being generally different from the storage block size.

DETAILED DESCRIPTION

Figure 1:
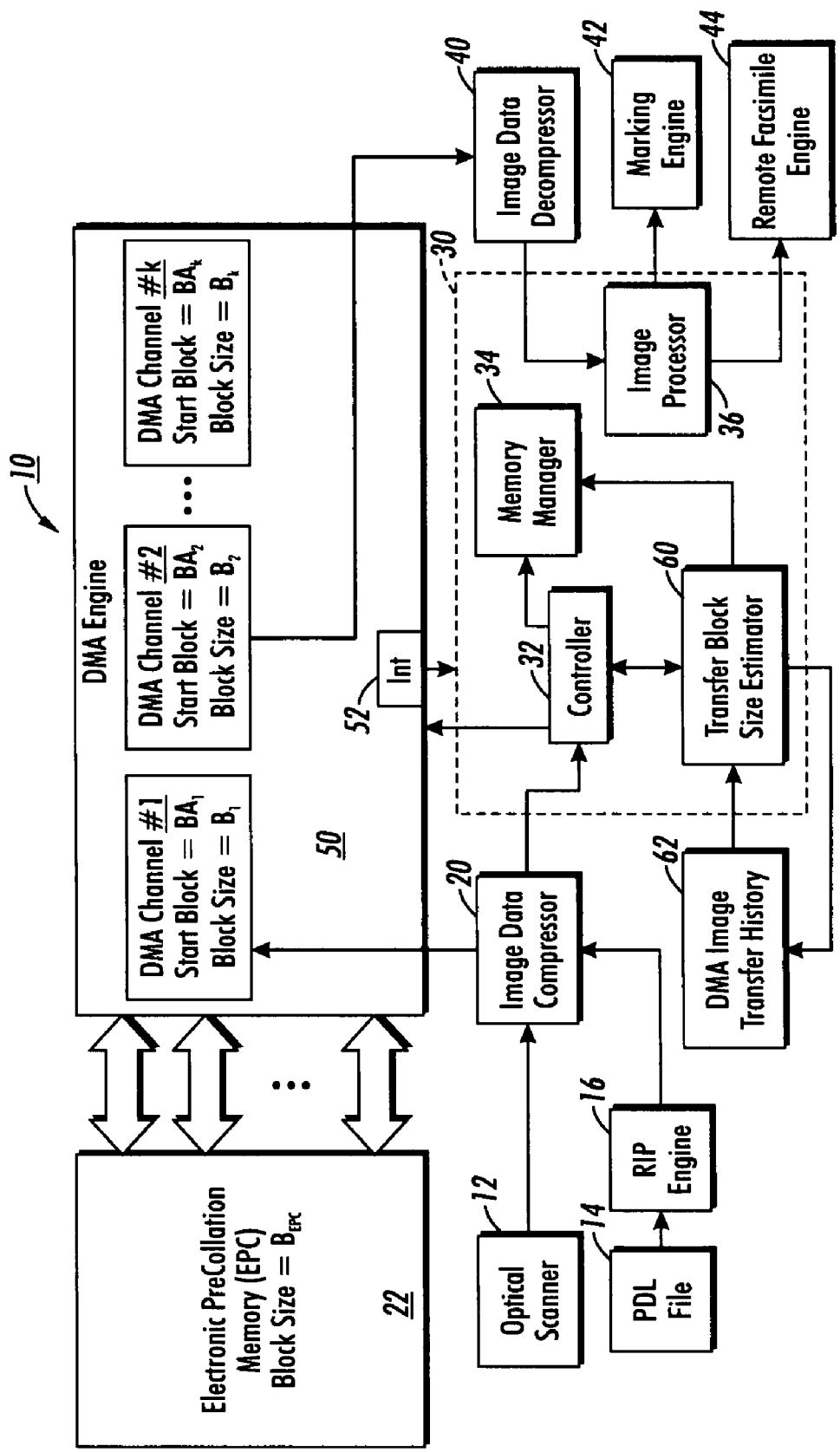
FIG. 1 diagrammatically shows a multifunction device (MFD) including at least photocopying, printing, and facsimile capabilities.

With reference to FIG. 1, an illustrative multifunction device (MFD) 10 includes photocopying, printing, and facsimile capabilities. Other functionalities, such as image scanning, collation, stapling, and so forth, are also contemplated. In a photocopying application, an optical scanner 12 scans one or more pages of a document. In one suitable embodiment, the optical scanner 12 includes a flatbed scanner for scanning pages of books, magazines, or other unwieldy sources, and also includes an automatic paper feed mechanism that enables one or more sheets to be scanned in a more automated fashion. The optical scanner includes a suitable optical reader such as a light source and an array of optical detectors (for example, a linear charge-coupled device (CCD) array that is mechanically scanned across the flatbed window, or a stationary two-dimensional CCD array, or so forth) that acquire an image of the paper or other hardcopy document. The image may be grayscale, halftone, bitmapped color, or so forth. A given optical scanner may be programmable to provide a selected one of a plurality of such outputs.

In a network printing application, a document is received in the form of a PostScript file, portable document format (PDF), Scalable Vector Graphics (SVG) format, or other page description language (PDL) formatted file 14. The PDL formatted file 14 may be generated in various ways, such as by a word processing program, spreadsheet program, presentation generation program, or other use application program, or by an accounting program, inventory program, or the like that automatically generates a report on a daily, weekly, monthly, or other basis, or by a computer-aided drawing (CAD) program, or so forth. The PDL formatted file 14 may include links to content stored in other files, or be otherwise organized into components. A raster image processing (RIP) engine 16 processes the received PDL formatted file 14 to produce an image of each page of the document in an image format suitable for printing.

The illustrated optical scanner 12 and RIP engine 16 are examples—other sources of images for printing such as a facsimile machine receiver are also contemplated. The illustrated optical scanner 12 and RIP engine 16 examples can also have additional aspects not illustrated herein. For example, the output of the optical scanner 12 may serve as input to a word processing document, image processing program, or other application program or suite of application programs that optionally perform image processing on the scanner output (e.g., resizing, cropping, bitmapped color→grayscale or grayscale→bitmapped color conversion, or so forth) and integrates the scanner output into the PDL file 14. In some embodiments, printing, facsimile, scan2export, and other tasks are organized as jobs. As used herein, the terms "print job" or "job" are used interchangeably, and are intended to encompass any suitable application unit processed by the MFD 10, and may include for example photocopy jobs, facsimile, scan2export jobs, and so forth. The term "scan2export" or "scan-to-export" refers to a process that digitally captures an image from a hardcopy document and prepares it for transfer to another device. The scan-to-export feature enables users to digitally capture hardcopy document images for transfer to other devices. For example, "scan-to-e-mail," "scan-to-mailbox" and "scan-to-network" features are examples of scan2export that generate digital representations of original documents and, transmit them as email attachments, deliver them to electronic mailboxes, or transfer them to remote network servers, respectively.

The images for printing received from the optical scanner 12, RIP engine 16, or other source are processed by an image data compressor 20 which compresses each image for efficient temporary storage. Substantially any compression algorithm can be used, such as a Lempel-Ziv (LZ) compression algorithm. Different compression algorithms are optionally used for images of different types, depending upon the type of image (e.g., grayscale v. bitmapped color), desired image quality (e.g., draft mode versus high quality mode), and other factors. The compressed image is stored in an electronic precollation memory (EPC) 22 that is organized as storage blocks each having a storage block size denoted herein as block size $B_{EPC}$.

The printing process is controlled by a central processing unit (CPU) 30, which may be a microprocessor, microcontroller, plurality of microprocessors, plurality of microcontrollers, or the like operatively connected with associated electronics such as a random access memory (RAM), read-only memory (ROM), math processing unit, graphical processing unit, or so forth that collectively implement functional components such as a controller 32, a memory manager 34, and an image processor 36. In the illustrated embodiment, the image data compressor 20 and a corresponding image data decompressor 40 are implemented separately from the CPU 30, for example as application-specific integrated circuitry (ASIC) components. In other embodiments, one or both of the image data compressor and the image data decompressor 40 are contemplated to be implemented by the CPU 30 as functional components.

In operation, the controller 32 operatively communicates with the image data compressor 20 and the memory manager 34 to accumulate and collate compressed images in the EPC 22 preparatory to printing. The image data decompressor 40 decompresses the stored and collated compressed images and feeds the decompressed images to the image processor 36, which communicates with a marking engine 42 to cause marking by the marking engine 42 of a sheet (e.g., a sheet of paper, a transparency sheet, or so forth) in accordance with the retrieved and decompressed images. Alternatively, in a facsimile application the image processor 36 communicates the retrieved and decompressed images to a remote facsimile machine 44, for example via telephonic communication, and the remote facsimile machine 44 includes a CPU and marking engine that cooperate to mark a sheet or sheets of paper in accordance with the retrieved and decompressed images.

In the described processing, one potential throughput bottleneck involves writing compressed image data to the EPC 22 and retrieving compressed image data from the EPC 22. To reduce or alleviate this potential throughput bottleneck, a direct memory access (DMA) engine 50 is provided. The DMA engine 50 is configured to operate autonomously from the CPU 30 to transfer blocks of compressed image data from the image compressor 20 into the EPC 22, and to transfer blocks of compressed image data from the EPC 22 to the image decompressor 40.

The illustrated DMA engine 50 provides a plurality of DMA channels, namely k channels denoted DMA #1, DMA #2, . . . DMA #k. The number of DMA channels can be substantially any number, such as one channel, two channels, three channels, four channels, five channels, ten channels, or so forth. Each DMA channel #1, #2, . . . , #k performs transfers of blocks of image data to or from the EPC 22, operating independently of the other channels and substantially independently of the CPU 30 except for coordinating communication such as for example via interrupts 52. In the instance illustrated in FIG. 1, for example, DMA channel #1 is currently being used to store compressed image data to the EPC 22 as it is output by the image data compressor 20, while DMA channel #2 is currently being used to retrieve compressed image data from the EPC 22 for input to the image data decompressor 40. These operations can be performed concurrently. The illustrative DMA channel #1 is configured to transfer blocks of size $B_1$, the illustrative DMA channel #2 is configured to transfer blocks of size $B_2$, and so forth, up to the illustrative DMA channel #k which is configured to transfer blocks of size $B_k$.

In some embodiments, the DMA engine 50 is configured to transfer blocks of compressed image data that are of the same size or larger than the EPC storage block size $B_{EPC}$ using a technique known as DMA chaining. In a suitable DMA chaining-based embodiment, each transfer block size is an integer multiple $N \geq 1$ of the storage block size $B_{EPC}$ of the EPC 22. That is, $B_1 = N_1 \times B_{EPC}$ starting at a start block $BA_1$, in the EPC 22, $B_2 = N_2 \times B_{EPC}$ starting at a start block $BA_2$ in the EPC 22, and so forth up to $B_k = N_k \times B_{EPC}$ starting at a start block $BA_k$ in the EPC 22. Thus, for example, if $N_1 = 4$ then initiation of DMA channel #1 causes transfer of image data to or from the EPC 22 starting at storage block $BA_1$ and continuing autonomously to transfer image data into or out of blocks $BA_1+1$, $BA_1+2$, and $BA_1+3$, all performed autonomously of the CPU 30. When the transfer of the four blocks is complete, the DMA engine 50 communicates to the CPU 30 that DMA channel #1 is available, for example via an interrupt 52. Multi-channel DMA engines, including multi-channel DMA engines that implement DMA chaining, are known in the art and are available commercially, and accordingly are not described in further detail herein.

The use of DMA engine 50 substantially increases the computational capacity, and hence the productivity throughput, of the illustrated MFD 10, or indeed of any marking engine-based device such as a standalone photocopier, standalone printer, modular printing system, or so forth. To maximize the throughput improvement achieved by DMA, the block size preferably equals the size of the compressed image data to be transferred, so that the entire compressed image can be transferred autonomously by the DMA engine 50 without intervention of the CPU 30. In a next best scenario, the image data size is a large integer multiple of the DMA transfer block size. For example, if DMA channel #1 is used to transfer an image of size $8 \times B_1$, then only eight interrupts of the CPU 30 are involved in the transfer.

If the transfer block size is much smaller than the image size, then far more CPU interruptions will be involved, thus reducing throughput. For example, if the image size is $100 \times B_1$, then one hundred CPU interrupts are involved in the transfer. This large number of interrupts can be expected to adversely affect throughput. Conversely, if the transfer block size is substantially larger than the image size, then space in the EPC 22 is wasted, since a number of storage blocks equal to the transfer block size will be allocated for the much smaller image. For example, if the image size is $3 \times B_{EPC}$, then it can in principle be stored in only three storage blocks of the EPC 22. However, if the transfer block size $B_1 = 20 \times B_{EPC}$, then twenty storage blocks will be allocated for the image, which is a substantial waste of storage space.

When a stored image is retrieved after collation for decompression by the image data decompressor 40, the size of the image is known a priori, and so the block size can be selected to closely match the image size.

When an image is being compressed and stored to the EPC 22, however, the compressed image size is not known a priori. Different types of images employing different types or levels of compression can involve vastly different amounts of storage in the EPC memory. For example, it is not uncommon for a color image to occupy 20-40 times, or more, storage space compared with an otherwise equivalent black-and-white image. As another example, the Lempel-Ziv (LZ) compression algorithm can produce compressed images with a size variation of a factor of ten or more, depending upon the complexity of the image selected. These difficulties can be enhanced by the practice, sometimes used in the industry, of custom optimizing the EPC memory block size $B_{EPC}$ at the MFD installation 10 to comport with typical images processed by the MFD 10. Such custom optimization can cause large deviations between the EPC memory block size and the image size. For example, if the MFD 10 is optimized for text printing by having small EPC memory blocks $B_{EPC}$, this will be inefficient when processing a job including substantial color imaging data, since each color image will typically occupy many of the small text-optimized EPC memory blocks.

In the MFD 10, the image block size for transfer of compressed image data to the EPC 22 is selected by transfer block size estimator 60 for the current transfer block based on previous DMA transfers of compressed image data into the EPC 22. The selected transfer block size is generally different from the storage block size $B_{EPC}$, where "generally different" encompasses the possibility that the transfer block size may equal the storage block size $B_{EPC}$ in cases where previous DMA transfer history indicates that a transfer block size equal to the storage block size $B_{EPC}$ will be most efficient. In a suitable approach illustrated in FIG. 1, the transfer block size estimator 60 communicates with the controller 32 as it coordinates DMA transfers via interrupts 52 to maintain a DMA image transfer history 62 containing probative information relating to previous DMA transfers. The time extent of information stored in the DMA image transfer history 62 is in some embodiments as short as previous transfers of image data for the current image. In other embodiments, the time extent of information stored in the DMA image transfer history 62 is concurrent with the current print job. In other embodiments, the time extent of information stored in the DMA image transfer history 62 extends across multiple print jobs, such as the last five jobs.

In some embodiments, the information stored in the DMA image transfer history 62 may be grouped by type, for example, the history of print jobs may be maintained separately from the history of photocopy jobs which in turn is maintained separately from the history of facsimile jobs. In some embodiments, the information stored in the DMA image transfer history 62 may be grouped by time-of-day, day-of-week, or other cyclical temporal information, and the cyclical temporal history information pertaining to previous transfers of compressed image data from the image compressor into the electronic memory is used by the transfer block size estimator 60 to adjust the transfer block size. For example, in some settings complex jobs are typically run late in the night to avoid interfering with daily users. Accordingly, by grouping the history information by hour or other "time-of-day" unit, the history will reflect that jobs run after hours are likely to be more complex, enabling the transfer block size estimator 60 to adjust the transfer block size accordingly for after hours jobs.

When a new image undergoes compression and storage, the transfer block size estimator 60 accesses the DMA image transfer history 62 to select an estimate of the "optimal" transfer block size for the current transfer block. This selected block size is input to the controller 32, which then communicates to the DMA engine 50 the selected transfer block size for the current DMA transfer of compressed image data. In the instance illustrated in FIG. 1, DMA channel #1 is being used for the compressed image data transfer into the EPC 22, and so the DMA engine 50 sets the transfer block size $B_1$ for DMA channel #1 to the selected transfer block size. In embodiments in which DMA chaining is used, this may involve setting an integer value N to a value of one or higher to indicate the number of blocks to transfer autonomously. For example, if the selected block size is 2000 bytes, and $B_{EPC}$=512 bytes, then by setting N=4 for DMA channel #1 it is ensured that DMA channel #1 will transfer four blocks, i.e. 2048 bytes, autonomously. In other words, when DMA chaining is used the number of chained blocks N for the DMA channel used to transfer the compressed image data into the EPC 22 is set to the lowest value of N such that $N \times B_{EPC}$ is greater than or equal to the selected transfer block size.

The transfer block size estimator 60 can use various algorithms to select the transfer block size. In one approach, the transfer block size is initially selected to be the smallest block size, e.g. $B_1=B_{EPC}$ (or $N_1$=1 if DMA chaining is used). As the image is compressed and transferred, the DMA image transfer history for the image undergoing compression is stored in the DMA image transfer history 62, including the number of image scan lines processed and the number of storage blocks of the EPC 22 consumed. A ratio of the number of scan lines processed and the number of storage blocks consumed is monitored by the transfer block size estimator 60. The ratio can be expressed in other ways, such as the number of scan lines stored per consumed storage block $B_{EPC}$ of the EPC 22, or the number of blocks consumed per 100 scan lines stored (ratio inverted here relative to the previous example), or so forth. Based on the ratio, the stressfulness of the image currently being compressed is determined. If the ratio satisfies a stressfulness criterion, then the transfer block size $B_1$ (or $N_1$ in the case of DMA chaining) is increased so that more storage blocks are requested at a time so as to reduce the number of CPU interrupts and increase transfer efficiency.

Figure 2:
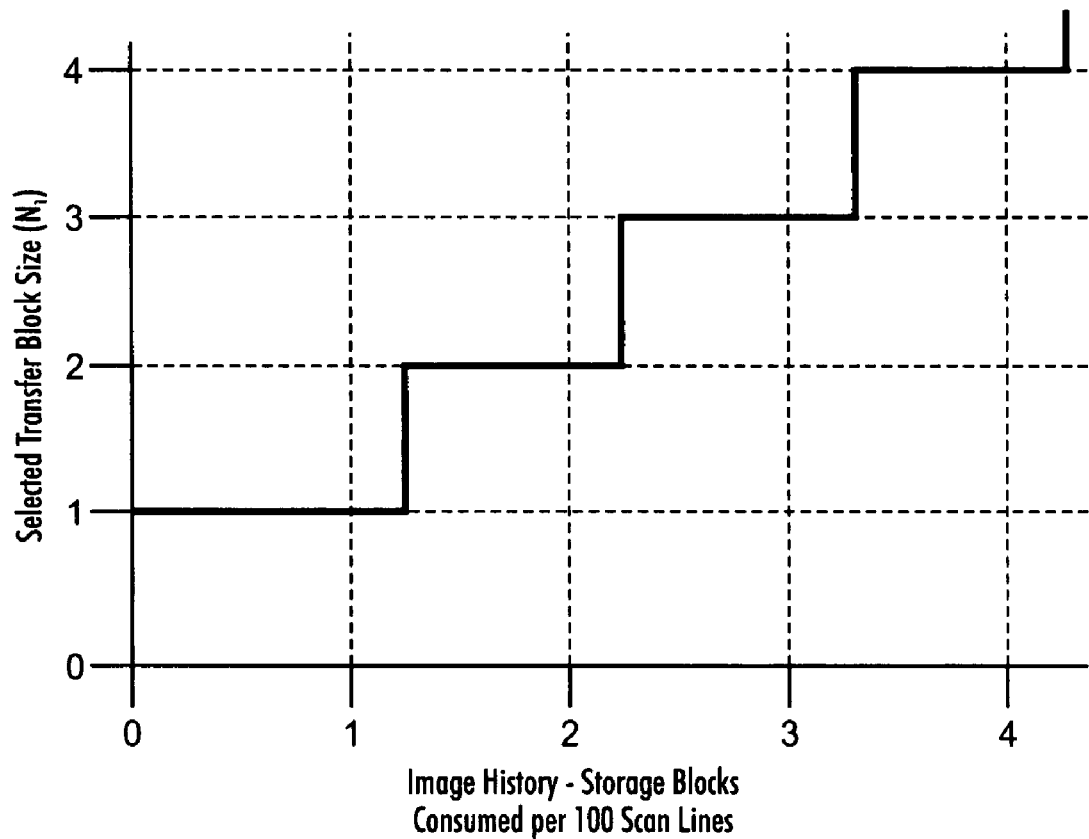
FIG. 2 graphically shows one algorithm embodiment suitably performed by the transfer block size estimator.

With reference to FIG. 2, an example of the above algorithm is graphically shown. In this illustrated example, the goal is to transfer about 100 scan lines at a time without CPU intervention, using a DMA engine having DMA chaining capability. In this case, N=1 initially, so that no DMA chaining is performed. However, if the ratio indicates that 100 scan lines is occupying substantially more than one block of the EPC 22 (e.g., ratio≧1.2 storage blocks per 100 scan lines in the example of FIG. 2) then N is incremented to N=2 so that DMA chaining is employed to load image data into two storage blocks of the EPC 22 at a time without CPU intervention. Similarly, if the ratio≧2.2 then N is incremented to N=3, and so forth.

When this approach is used in an MFD that usually processes small (e.g., draft mode black-and-white) images for which the ratio<1, it is seen that in the usual case DMA chaining is not used—since the typical image is small, this is efficient. However, when a large and/or weakly compressed image is encountered (for example, a color image and/or a high quality image for which lower compression is used), the image history will quickly develop a storage blocks-to-100 scan lines ratio that substantially exceeds unity, causing the transfer block size estimator 60 to increase the block size (or equivalently, the DMA chaining factor N) in accordance with the algorithm shown in FIG. 2. This brings DMA chaining into action so as to ensure that on average about 100 scan lines of the high resolution image data are transferred autonomously via DMA chaining without CPU intervention. In some DMA chaining embodiments, the DMA engine 50 is programmed to interrupt the CPU 30 at (N-m) blocks rather than after the full number N of blocks are stored, where the parameter "m" is a selected integer such as 1, 2, 3, or so forth. This enables the CPU to operate concurrently with the DMA transfer to perform some block allocation operations such as updating N in case the image size is larger than the N allocated blocks. It is also contemplated for the parameter "m" (or another parameter indicative of the time at which the DMA engine sends the interrupt indicative of impending completion of storage of the current transfer block) to be adjusted based on the DMA image transfer history 62, for example by increasing m if the history indicates the CPU should have more processing overlap time. Once compression and storage of the large image is complete, the transfer block size is reset to N=1 if the DMA image transfer history 62 is maintained on a per-image basis, to accommodate the next, likely small image. If the DMA image transfer history 62 is maintained on a longer-term basis, then there may be a transition during which an undesirably large transfer block size is used—however, this transition will be short since the ratio will quickly drop back to a low number of storage blocks per 100 scan lines as the next, likely small, image is processed.

In some embodiments, it is contemplated for the transfer block size estimator 60 to predict slightly ahead of time the number of blocks an image will be occupying in the EPC 22, so as to, for example, enable notification of the space available in the EPC 22 and optionally warning of any impending exhaustion of the space available in the EPC 22.

The "blocks consumed" portion of the ratio can be computed at various times. In one approach, the blocks consumed are computed at the time each DMA interrupt is sent, so that up-to-date ratio information is available to the transfer block size estimator 60 for selection of the transfer block size for the next (possibly DMA chained) transfer operation. Moreover, it is to be recognized that the ratio is suitably computed for each DMA channel that is performing transfer of compressed image data into the EPC 22. In the embodiment illustrated in FIG. 1 the transfer block size estimator 60 is a functional component implemented by the CPU 30, which is advantageous from the standpoint that it allows use of conventional commercially available DMA engine components. However, it is also contemplated to integrate the transfer block size estimation functionality into the DMA engine, or into the image data compressor.

In another embodiment, the algorithm implemented by the transfer block size estimator 60 computes the average compression for several image compressions, maintains this information in the DMA image transfer history 60, and uses the information to select the transfer block size for the current transfer. The average compression for each image is suitably computed as a ratio of the uncompressed image size and the number of storage blocks of size $B_{EPC}$ consumed in storing the image in compressed format in the EPC 22. The average compression of the last image, or the last few images, e.g. the last two or three images, is then used in selecting the transfer block size for the current image. In general, as the compression ratio decreases (i.e., lower compression) it is expected that more storage blocks will be consumed on average for each image, and so the selected block size is increased accordingly. In some embodiments, compression ratios for different types of images or different image sources may be stored in the DMA image transfer history 62 to provide further optimization. For example, different compression ratios may be stored for (i) the last few images acquired using the optical scanner 12; and (ii) the last few images received as PDL files 14 processed by the RIP engine 16. Similarly, different compression ratio histories or other DMA image transfer histories may be stored for different users or job sources, different periods of the day (e.g., useful if longer print jobs are performed in the late evening), or so forth.

A combination of the aforementioned two embodiments is also contemplated. For example, the transfer block size for a new image may be initially set to a value determined based on the average compression for the last few images. Thereafter, the approach described with reference to FIG. 2 is used to dynamically adjust the transfer block size during compression and storage of the new image.

The illustrative MFD 10 of FIG. 1 is an example. Other devices that employ on-the-fly image compression can also benefit from the DMA image history-based transfer block size adjustment techniques disclosed herein. For example, on-the-fly video compression can benefit from these techniques.

Figure 3:
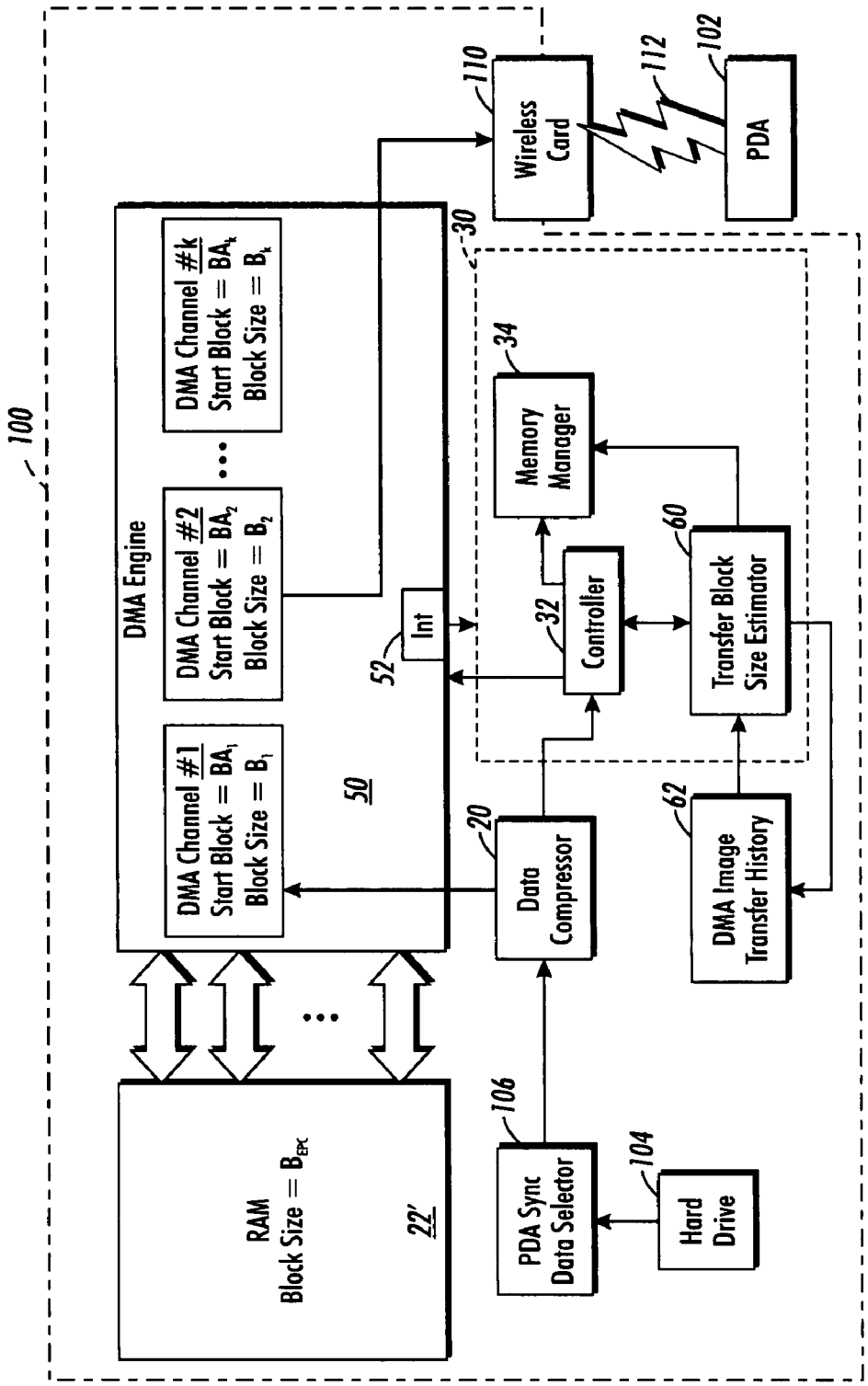
FIG. 3 diagrammatically shows a computer configured to synchronize selected data with a personal data assistant (PDA).

With reference to FIG. 3, another illustrative example of an application that beneficially employs the DMA image history-based transfer block size adjustment techniques disclosed herein is described. The application of FIG. 3 includes a computer 100 that is to synchronize selected data with a personal data assistant (PDA) 102. Instead of the illustrated PDA 102, the computer 100 can be synchronized with another computer (e.g., a laptop computer), a portable music player (e.g., a so-called "MP3" player), an electronic photograph frame, or so forth. FIG. 3 includes many of the same components as the MFD 10 of FIG. 1, and these components are labeled with like reference numbers. The EPC 22 of the MFD 10 is replaced in FIG. 3 by a functionally equivalent random access memory (RAM) 22' in accordance with terminology typically employed in describing computer memory. The computer 100 further includes a hard drive 104 or other mass storage device that stores data including the data to be synchronized with the PDA 102. A PDA synchronization data selector 106 selects the data to be synchronized. The data may be images or, more generally, files. The term "file" as used herein is intended to represent any group of data that are stored together and intended to be kept together as a functional unit. Some illustrative examples of files include digital images, spreadsheet files, word processing files, executable program files, database files, and so forth. The output of the PDA synchronization selector is input the data compressor 20 which compresses the images or files. The DMA engine 50 stores the compressed data in the RAM 22'. The transfer block size estimator 60 operates as described previously to select the transfer block size for the current transfer. For example, the algorithm of FIG. 2 can be employed on a per image or per file basis. For files, the scan lines parameter can be replaced by, for example, a selected quantity of uncompressed data. Thus, for example, the abscissa of FIG. 2 could be replaced by "file history—storage blocks consumed per 10 kilobytes of uncompressed data" and the ratio computed as before, e.g. number of storage blocks consumed per 10 kilobytes of uncompressed data. Similarly, the described compression ratio is directly adaptable to files, simply by computing the compression ratio as the compressed file size ratioed with respect to the uncompressed file size.

The compressed data is stored in the RAM 22' via the DMA engine 50. A wireless card 110 then retrieves the stored compressed data, again using the DMA engine 50, and generates a wireless transmission 112 of the compressed data that is received by the PDA 102. The PDA can process the received compressed data in any suitable manner, such as by storing it in compressed format until requested and then decompressing the requested data, or by decompressing the compressed data as it is received and storing the decompressed files.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image processing device comprising:
a marking engine;
an image compressor configured to compress image data;
an image decompressor configured to decompress image data previously compressed by the image compressor;
an electronic memory organized as storage blocks each having a storage block size;

a direct memory access (DMA) engine configured to transfer compressed image data from the image compressor into the electronic memory and to transfer compressed image data from the electronic memory to the image decompressor;

a central processing unit (CPU) configured to coordinate operations of at least the marking engine and DMA engine to cause the marking engine to generate markings in accordance with selected image data input to the image compressor; and a transfer block size estimator configured to adjust a transfer block size used in transfer of compressed image data from the image compressor into the electronic memory based on analysis of previous transfers of compressed image data from the image compressor into the electronic memory, the DMA engine being further configured to transfer a unit of compressed image data having the transfer block size from the image compressor into the electronic memory without intervention of the CPU.

2. The image processing device as set forth in claim 1, wherein the selected transfer block size defines a transfer block size for a single DMA transfer operation.

3. The image processing device as set forth in claim 1, wherein the transfer block size estimator is configured to select the transfer block size as N storage blocks where N is an integer greater than or equal to one, and the DMA engine is configured to transfer a unit of compressed image data having the transfer block size from the image compressor into the electronic memory via N DMA transfer operations using DMA chaining.

4. The image processing device as set forth in claim 1, wherein:
the image processing device is configured to perform jobs; and
the transfer block size estimator is configured to adjust the transfer block size used in transfer of compressed image data from the image compressor into the electronic memory after an interval defined by performance of a selected number of jobs based on analysis of transfers of compressed image data from the image compressor into the electronic memory occurring over the course of performance of the selected number of jobs.

5. The image processing device as set forth in claim 1, wherein the transfer block size estimator is configured to adjust the transfer block size based on cyclical temporal history information pertaining to previous transfers of compressed image data from the image compressor into the electronic memory.

6. The image processing device as set forth in claim 1, wherein the transfer block size estimator is configured to occasionally adjust the transfer block size used in transfer of compressed image data from the image compressor into the electronic memory based on a ratio of (i) compressed scan lines of image data and (ii) quantity of storage blocks of the electronic memory consumed by said compressed scan lines.

7. The image processing device as set forth in claim 1, further comprising:
an optical scanner configured to generate image data for input to the image compressor.

8. The image processing device as set forth in claim 7, wherein the image processing device is a multi-function device (MFD) that provides at least photocopying functionality in conjunction with the optical scanner and the marking engine and printing functionality in conjunction with the marking engine.

9. The image processing device as set forth in claim 7, wherein the CPU is disposed in a first facsimile machine, the marking engine is disposed in a second facsimile machine operatively connected with the first facsimile machine, and the CPU coordinates operation of the marking engine by operatively communicating with the second facsimile machine.

10. The image processing device as set forth in claim 7, wherein the image processing device is a multi-function device (MFD) that provides scan-to-export functionality in conjunction with the optical scanner.

11. A compression and storage device comprising:
a compressor configured to compress data;
a central processing unit (CPU) configured to control storage of the compressed data and to perform at least one additional task;
an electronic memory organized as storage blocks each having a storage block size;
a direct memory access (DMA) engine configured to operate autonomously from the CPU to transfer a current transfer block of compressed data into one or more storage blocks of the electronic memory; and
a transfer block size estimator configured to select a transfer block size for the current transfer block based on previous DMA transfers of compressed data, the selected transfer block size being generally different from the storage block size.

12. The compression and storage device as set forth in claim 11, wherein the DMA engine configuration includes a plurality of independent DMA channels and a transfer block size for each DMA channel.

13. The compression and storage device as set forth in claim 11, wherein the transfer block size estimator is configured to select the transfer block size as N storage blocks where N is an integer greater than or equal to one, and the DMA engine is configured to transfer the current transfer block of compressed data into N storage blocks of the electronic memory using DMA chaining.

14. The compression and storage device as set forth in claim 11, wherein the DMA engine is configured to interrupt the CPU after transfer of the current transfer block is complete.

15. The compression and storage device as set forth in claim 11, wherein the transfer block size estimator operates on a per-image or per-file basis, and is configured to select the transfer block size for the current transfer block based on an analysis of previous DMA transfers of compressed data for the image or file currently being transferred.

16. The compression and storage device as set forth in claim 15, wherein for an image transfer, the analysis includes determining a ratio of:
(i) number of scan lines in the transferred portion of the image currently being transferred and
(ii) storage blocks of memory consumed by the transferred portion of the image currently being transferred.

17. The compression and storage device as set forth in claim 11, wherein the transfer block size estimator is configured to select the transfer block size for the current transfer block based at least in part on an analysis of previous DMA transfers of compressed data for one or more previously transferred images or files.

18. The compression and storage device as set forth in claim 17, wherein the transfer block size estimator is configured to:
estimate a typical compression ratio achieved for said one or more previously transferred images or files, and estimate the transfer block size for the current transfer block based on the typical compression ratio and an uncompressed size of the image or file currently being transferred.

19. The compression and storage device as set forth in claim 11, wherein the at least one additional task performed by the CPU includes causing the DMA engine to retrieve compressed images from the electronic memory, decompressing or causing decompression of the retrieved images, and causing marking of a sheet in accordance with the retrieved and decompressed images.

20. The compression and storage device as set forth in claim 11, wherein the at least one additional task performed by the CPU includes causing the DMA engine to retrieve compressed images or files from the electronic memory and causing wireless transmission of the retrieved compressed images or files.

21. The compression and storage device as set forth in claim 11, wherein the at least one additional task performed by the CPU includes causing an optical scanner to generate image data that is input to the compressor.

22. An image processing device comprising:
a marking engine;
an image compressor configured to compress image data;
an image decompressor configured to decompress image data previously compressed by the image compressor;
an electronic memory;
a direct memory access (DMA) engine configured to transfer compressed image data from the image compressor into the electronic memory and to transfer compressed image data from the electronic memory to the image decompressor;
a central processing unit (CPU) configured to coordinate operations of at least the marking engine and DMA engine to cause the marking engine to generate markings in accordance with selected image data input to the image compressor; and
a transfer block size estimator configured to adjust a transfer block size for autonomous transfer of compressed image data from the image compressor into the electronic memory based on analysis of previous transfers of compressed image data from the image compressor into the electronic memory.

23. The image processing device as set forth in claim 22, wherein the transfer block size estimator is configured to select the transfer block size as N storage blocks where N is an integer greater than or equal to one, and the DMA engine is configured to transfer a unit of compressed image data having the transfer block size from the image compressor into the electronic memory using DMA chaining.

24. The image processing device as set forth in claim 22, wherein the transfer block size estimator is configured to adjust the transfer block size less often than after every autonomous transfer.

* * * * *